United States Patent Office 3,328,396
Patented June 27, 1967

3,328,396
**3,8-DI-SUBSTITUTED-3,8-DIAZABICYCLO
[3.2.1]OCTANES**
Frederick Karl Kirchner, Bethlehem, N.Y., assignor to
Sterling Drug Inc., New York, N.Y., a corporation of
Delaware
No Drawing. Filed Nov. 9, 1961, Ser. No. 151,207
33 Claims. (Cl. 260—243)

My invention comprises new and useful chemical compounds which have the novel heterocyclic ring system

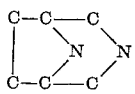

The invention also comprises intermediates and processes used in the preparation of the novel heterocyclic compounds.

Specifically, in one of its aspects, my invention comprises 3,8-diazabicyclo[3.2.1]octanes having the formula

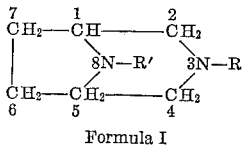

Formula I wherein R and R' can be the same or different and are selected from the group consisting of H, lower-alkyl, lower-alkenyl, cycloalkyl, monocarbocyclic aryl, monocarbocyclic-aryl-lower-alkyl, acyl, hydroxy-lower-alkyl and derivatives thereof; and amino-lower-alkyl and derivatives thereof.

In another of its aspects, my invention comprises intermediates for the preparation of the compounds of Formula I, said intermediates having the formula

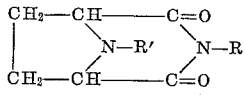

Formula II wherein R and R' have the meanings given above.

In still another aspect, my invention comprises a process for preparing substituted 3,8-diazabicyclo[3.2.1]octanes which comprises reacting a 1 - substituted-2,-5-bis-(carboalkoxy)pyrrolidine having the formula

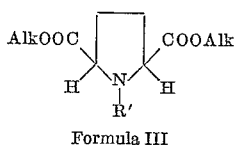

Formula III wherein R' has the meaning given above and Alk is an alkyl group, the nature of which is not critical, with a primary amine, RNH$_2$, forming 3,8-disubstituted-2,4-dioxo-3,8-diazabicyclo[3.2.1]octanes as shown in Formula II, and subsequently reducing the latter compounds with an appropriate reducing agent, for example lithium aluminum hydride or hydrogen with a catalyst.

In the above Formulas I, II, and III, R and R' have been defined as H, lower-alkyl, lower-alkenyl, cycloalkyl, monocarbocyclic-aryl, aryl-lower-alkyl, acyl, hydroxy-alkyl and derivatives thereof or aminoalkyl and derivatives thereof. Lower-alkyl means a straight- or branched-chain saturated aliphatic radical preferably having from one to six carbon atoms. Exemplary of such lower-alkyl radicals are methyl, ethyl, n-propyl, isopropyl, n-butyl, isobutyl, tert-butyl, sec-butyl, n-amyl, n-hexyl, and the like.

The lower-alkenyl radicals are straight- or branched-chain aliphatic radicals containing at least one double bond and preferably having from two to six carbon atoms, for example, allyl, 2-butenyl, methallyl, 3-butenyl, 2-pentenyl, 2,4-pentadienyl, 3-hexenyl, and the like.

The cycloalkyl radicals are saturated cyclic aliphatic radicals preferably containing from three to eight ring carbon atoms, for example cyclopropyl, cyclobutyl, cyclopentyl, cyclohexyl, 4-methylcyclohexyl, cycloheptyl, cyclooctyl, and the like.

Monocarbocyclic-aryl refers to a radical of the benzene series and incudes such groups as phenyl and phenyl substituted by low molecular weight substituents, for example lower-alkyl, lower-alkoxy, dialkylamino, halogen, nitro, trihalomethyl, and the like. The substituted phenyl radicals have preferably from one to three substituents which can be in any of the available positions of the phenyl nucleus, and where more than one substituent is present, they can be the same or different and they can be in any of the various position combinations relative to each other.

The preferred group of monocarbocyclic-aryl radicals are phenyl and phenyl bearing from one to three substituents, for example 4-chlorophenyl, 2,4-dichlorophenyl, 4-nitrophenyl, 3,4,5 - trimethoxyphenyl, 4-methylmercaptophenyl, 3-methylphenyl, and the like.

Monocarbocyclic-aryl-lower-alkyl refers to a monocarbocyclic aryl radical, as defined above, bonded through a divalent saturated lower-aliphatic radical. Exemplary of monocarbocyclic-aryl-lower-alkyl radicals are benzyl, 4-chlorobenzyl, 3,4 - dichloro-benzyl, 2 - methoxybenzyl, phenylethyl, phenylpropyl, 1-phenyl-1-ethyl, and the like.

The term acyl refers to a radical of low molecular weight derived from an organic sulfonic or carboxylic acid by the removal of the hydroxyl group. A preferred group of acyl radicals includes lower-alkanoyl, for example formyl, acetyl, propionyl, butyryl, isobutyryl, valeryl, caproyl, and the like; carboxy-lower-alkanoyl, for example hemisuccinyl, hemi-glutaryl, hemi-adipyl, and the like; monocarbocyclic aroyl, for example benzoyl, p-toluyl, p-nitrobenzoyl, 3,4 - dichlorobenzoyl, 3,4,5-trimethoxybenzoyl, and the like; monocarbocyclic-aryl-lower-alkanoyl, for example phenylacetyl, 2-phenylpropionyl, p-nitrophenylacetyl, and the like; lower-alkenoyl, for example acryloyl, crotonoyl, and the like; monocarbocyclic-aryl-lower-alkenoyl, for example cinnamoyl, p-nitrocinnamoyl, and the like; carbamyl and thiocarbamyl, for example carbamyl, N-phenylcabamyl, N-phenylthiocarbamyl, N-benzhydrylcarbamyl, N-(4 - chlorobenzhydryl)-thiocarbamyl, and the like; alkanesulfonyl, for example ethanesulfonyl, methanesulfonyl, propanesulfonyl, and the like; and monocarbocyclic-arylsulfonyl, for example benzenesulfonyl, p-toluenesulfonyl, p-chlorobenzenesulfonyl, and the like.

Hydroxy-lower-alkyl radicals are lower-alkyl radicals as defined above substituted by at least one hydroxyl group, for example 2-hydroxyethyl, 3-hydroxypropyl, 2-hydroxypropyl, 2,3-dihydroxypropyl, 4-hydroxybutyl, and the like.

Derivatives of the hydroxyalkyl radicals encompassed by my invention include lower-alkoxy-lower-alkyl and carboxylic-acyloxy-lower-alkyl, i.e., lower-alkanoyloxy- and aroyloxy-lower-alkyl radicals.

Amino-lower-alkyl radicals are lower-alkyl radicals as defined above substituted by at least one amino group, for example, 2-aminoethyl, 3-aminopropyl, 2-aminopropyl, and the like.

Derivatives of the aminoalkyl radicals encompassed by my invention include alkyl-, aryl-, and aralkyl-substituted aminoalkyl and acylaminoalkyl groups. The preferred group is di-(lower-alkyl)amino-lower-alkyl.

The intermediate compounds of Formula II are readily prepared from diesters of 2,5-pyrrolidinedicarboxylic acid by heating at 150–350° with the appropriate primary amine bearing the desired substituent, R. The reaction can conveniently be carried out in the absence of an additional solvent, but if desired, a suitable inert solvent can be used. It is desirable, though not essential, to distill the alcoholic by-product from the mixture as the reaction proceeds, thus driving the reaction to completion. In most cases, the reaction requires several hours for completion.

The 3,8-diazabicyclo[3.2.1]octanes of Formula I in which R is lower-alkyl, lower-alkenyl, cycloalkyl, aryl, aralkyl, and substituted alkyl, are prepared by reduction of the 2,4-dioxo-3,8-diazabicyclo[3.2.1]octane of Formula II with a suitable reducing agent, preferably lithium aluminum hydride. The reaction is carried out in an inert reaction medium, preferably an ether, for example, diethyl ether, tetrahydrofuran, anisole, dibutyl ether and the like. It is desirable to carry out the reaction at the reflux temperature of the solvent employed, although in most cases reduction occurs slowly at room temperature.

Compounds of Formula I wherein R is acyl are conveniently prepared by catalytic debenzylation of the corresponding 3-benzyl-3,8-diazabicyclo[3.2.1]octane (Formula I, R=CH₂—C₆H₅) with for example hydrogen in the presence of a palladium catalyst, followed by acylation of the resulting secondary amino group with a suitable acylating agent. Suitable acylating agents are acid halides and acid anhydrides.

The latter procedure can be used as an alternative route to compounds of Formula I wherein R is alkyl, aralkyl, nitroaryl, alkenyl, and cycloalkyl by simple alkylation of the 3-unsubstituted-3,8-diazabicyclo[3.2.1]octane with alkyl, aralkyl, nitroaryl, alkenyl, and cycloalkyl halides or sulfonates in the presence of a proton acceptor.

Other standard alkylation procedures can be used to prepare compounds of Formula I, and such procedures will be obvious to one skilled in the art in the light of this disclosure. Exemplary of alternative alkylation procedures are the reaction of 3- or 8-unsubstituted 3,8-diazabicyclo[3.2.1]octane with epoxides, for example ethylene oxide, resulting in the formation of beta-hydroxy-alkyl substituents; the Mannich alkylation of compounds bearing an "active" hydrogen atom, for example ketones, aliphatic carboxylic acid esters, phenols, and certain heterocyclic compounds, for example indole and antipyrine; and methylation by means of the Eschweiler-Clarke reaction with formic acid and formaldehyde.

The following flow-chart illustrates the interrelationship between the alternative processes and their respective products:

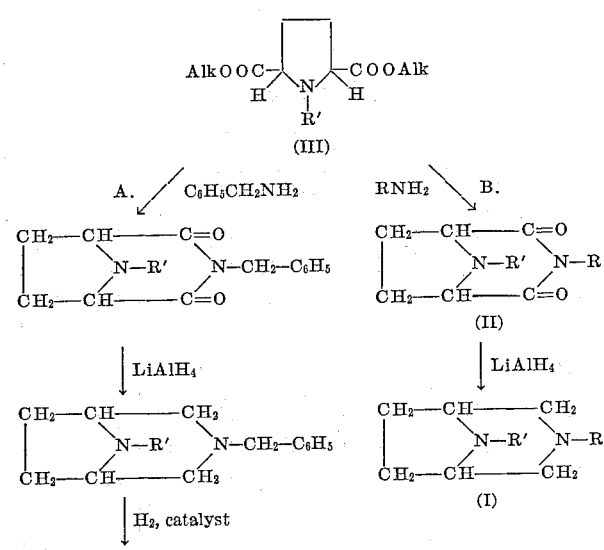

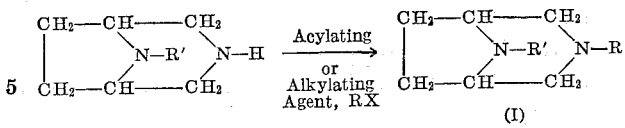

In Process A, R in the final product (I) can be H, lower-alkyl, lower-alkenyl, cycloalkyl, monocarbocyclic-aryl, monocarbocyclic-aryl-lower-alkyl, acyl, hydroxy-lower-alkyl, acyloxy-lower-alkyl, amino-lower-alkyl or dialkylamino-lower-alkyl.

In Process B of the above flow-chart, R in the final product (I) can be H, lower-alkyl, lower-alkenyl, cycloalkyl, monocarbocyclic-aryl, monocarbocyclic-aryl-lower-alkyl, hydroxy-lower-alkyl, amino-lower-alkyl, or dialkylamino-lower-alkyl.

The new 3,8-diazabicyclo[3.2.1]octanes are basic substances and are most conveniently used in the form of their water-soluble, physiologically-acceptable acid-addition salts. Physiologically acceptable salts are salts whose anions are relatively innocuous to the animal organism in therapeutic doses of the salts. Appropriate acid-addition salts are those derived from mineral acids, for example, hydrochloric acid, hydrobromic acid, nitric acid, sulfuric acid, phosphoric acid, and the like, and from organic carboxylic and sulfonic acids, for example, acetic acid, citric acid, tartaric acid, lactic acid, gluconic acid, maleic acid, methanesulfonic acid, benzenesulfonic acid, p-chlorobenzenesulfonic acid, and the like.

Although the acid-addition salts preferably have anions which are pharmacologically acceptable, salts having toxic anions are also useful in that they may serve as characterizing derivatives of the free bases and serve as intermediates for non-toxic salts by way of ion-exchange reactions. All acid-addition salts, regardless of the nature of the anions, are useful as intermediates in the purification of the free bases.

The acid-addition salt forms are prepared by dissolving the free base in an aqueous solution containing the appropriate acid and isolating the salt by evaporating the solvent, or by reacting the free base and the acid in an organic solvent, in which case the salt separates directly or can be isolated by concentrating the solution. The number of equivalents of acid which enter into salt formation depends upon the amount of acid present and upon the number of amino groups present in the free base. If an excess of acid is used, the number of equivalents of acid used will equal the number of basic nitrogens present in the free base.

Still another aspect of my invention comprises the quaternary ammonium salts of the free bases shown in Formulas I and II. The quaternary ammonium salts are obtained by the addition of alkyl, alkenyl, and aralkyl esters of inorganic acids or organic sulfonic acids to the free base form of the compounds. The alkyl, alkenyl, and aralkyl esters so used include such compounds as methyl iodide, methyl bromide, ethyl bromide, allyl chloride, methyl sulfate, methyl benzenesulfonate, ethyl p-chlorobenzenesulfonate, benzyl chloride, benzyl bromide, p-nitrobenzyl chloride, o-chlorobenzyl chloride, and the like.

The quaternary ammonium salts are prepared by mixing the free base and the alkyl, alkenyl, or aralkyl esters in an organic solvent. Heating may be used to facilitate the reaction, although salt formation in some cases takes place readily at room temperature. The quaternary ammonium salt separates directly or can be isolated by concentration of the solution. The number of equivalents of alkyl ester entering into salt formation depends upon the amount of ester present relative to the amount of free base and on the number of basic amino groups present in the free base. If an excess of alkyl halide or other ester is used as a quaternizing agent, some or all of the basic amino groups present in the free base may be quaternized, depending upon the reaction conditions such as the temperature.

Like the acid addition salts, the quaternary ammonium salts are useful for characterizing the free bases of the invention. Hence, the toxicity or non-toxicity of the particular anion associated with the quaternary cation is of little significance, and for this purpose a toxic quaternary ammonium salt can be as useful as a non-toxic one. It is possible to convert one salt to another having a different anion by conventional ion exchange reaction.

The compounds of my invention have been found by standard pharmacological testing procedures to have spasmolytic and local anesthetic activities, indicating their usefulness in the treatment of peptic ulcer, pylorospasm, and chronic hypertropic gastritis and for producing localized anesthesia in minor surgical procedures.

The structures of the compounds were determined by their mode of preparation and by the correspondence of calculated and found values for elemental analyses of representative samples.

The following examples will further illustrate the invention without the latter being limited thereto.

*Example 1A.—3-benzyl-2,4-dioxo-8-methyl-3,8-diazabicyclo[3.2.1]octane*

Into a three-necked flask fitted with a thermometer, dropping funnel, and a Vigreaux column and condenser leading to a graduated cylinder was placed 22.9 g. (0.1 mole) of diethyl 1-methyl-2,5-pyrrolidinedicarboxylate. The ester was heated to 150° and to it was added 10.7 g. (0.1 mole) of benzylamine during fifteen minutes. When the temperature of the reaction mixture was increased to 180°, ethanol began to distill. During a two hour period the temperature was increased to 280°, and 7.2 ml. of ethanol was collected. The red residue was crystallized from 100 ml. of absolute ethanol following treatment with activated charcoal. The 3-benzyl-2,4-dioxo-3-methyl-3,8-diazabicyclo[3.2.1]octane thus produced was recrystallized from hexane to give off-white crystals melting at 100.0–104.4° C. (corr.). The picrate salt, recrystallized from ethanol, melted at 175–178° C. with decomposition.

*Example 1B.—3-benzyl-8-methyl-3,8-diazabicyclo[3.2.1]octane*

To a mixture of 3.5 g. of lithium aluminum hydride in 300 ml. of absolute ether was added a solution containing 10.0 g. (0.041 mole) of 3-benzyl-2,4-dioxo-8-methyl-3,8-diazabicyclo[3.2.1]octane (Example 1A, above) in 250 ml. of absolute ether during fifteen minutes. Spontaneous refluxing occurred, and gentle refluxing was continued for about four hours after the addition. The mixture was then allowed to stand overnight. The excess lithium aluminum hydride was decomposed with ethanol, and about 200 ml. of 20 percent sodium hydroxide solution was added with stirring. The aqueous layer was extracted with ether and the ether extracts were dried over anhydrous calcium sulfate. After the solvent was removed under reduced pressure, the remaining oil was distilled. The 3 - benzyl-8-methyl - 3,8 - diazabicyclo[3.2.1]octane boiled at 84–94° at 9.2 mm.; $n_D^{25}$ 1.5368.

*Example 1C.—3-benzyl-8-methyl-3,8-diazabicyclo[3.2.1]octane monomethiodide*

Upon refluxing 2.0 g. of 3-benzyl-8-methyl-3,8-diazabicyclo[3.2.1]octane in ether with excess methyl iodide for one hour, 3-benzyl-8-methyl-3.8-diazabicyclo[3.2.1]octane monomethiodide precipitated as a white solid. Recrystallization from absolute ethanol gave the pure product which melted at 245.0–248.2° C. (corr.).

*Example 2.—8-methyl-3,8-diazabicyclo[3.2.1]octane dihydrochloride*

Ten grams of 3 - benzyl-8-methyl-3,8-diazabicyclo-[3.2.1]octane dissolved in 400 ml. of absolute ethanol was made acidic with concentrated hydrochloric acid and was hydrogenated over a palladium-charcoal catalyst for six hours at 23° and at 45 p.s.i. After the catalyst had been removed by filtration and washed with boiling water, 15 ml. of concentrated hydrochloric acid was added to the combined filtrates, and the solvent was removed under reduced pressure. Crystallization of the residue from ethanol gave 8-methyl-3,8-diazabicyclo[3.2.1]octane dihydrochloride which melted at about 325° C. with decomposition.

*Example 3A.—3-(3,4-dichlorobenzyl)-8-methyl-2,4-dioxo-3,8-diazabicyclo[3.2.1]octane*

According to the procedure given in Example 1A, 3-(3,4 - dichlorobenzyl)-8-methyl-2,4-dioxo-3,8-diazabicyclo[3.2.1]octane was prepared from diethyl 1-methylpyrrolidine-2,5-dicarboxylate and 3,4-dichlorobenzylamine. After recrystallization from absolute ethanol, the pure product melted at 103.6–108.6° C. (corr.).

*Example 3B.—3-(3,4-dichlorobenzyl)-8-methyl-3,8-diazabicyclo[3.2.1]octane dihydrochloride*

Following the procedure given in Example 1B, 3-(3,4-dichlorobenzyl) - 2,4 - dioxo-8-methyl-3,8-diazabicyclo-[3.2.1]octane was reduced with lithium aluminum hydride. The pure 3-(3,4-dichlorobenzyl)-8-methyl-3,8-diazabicyclo[3.2.1]octane dihydrochloride thus produced melted at 216.4–220.8° C. (corr.).

*Example 3C.—3-(3,4-dichlorobenzyl)-8-methyl-3,8-diazabicyclo[3.2.1]octane ethobromide*

Following the procedure given in Example 1C, 3-(3,4-dichlorobenzyl) - 8-methyl-3,8 - diazabicyclo[3.2.1]octane can be reacted with ethyl bromide to give 3-(3,4-dichlorobenzyl) - 8-methyl-3,8-diazabicyclo[3.2.1]octane ethobromide.

*Example 4A.—3-(4-dimethylaminobenzyl)2,4-dioxo-8-methyl-3,8-diazabicyclo[3.2.1]octane dihydrochloride*

Following the procedure given in Example 1A, 3-(4-dimethylaminobenzyl) - 2,4-dioxo-8-methyl-3,8 - diazabicyclo[3.2.1]octane was prepared from diethyl 1-methyl-2,5-pyrrolidine dicarboxylate and 4-dimethylaminobenzylamine. The dihydrochloride salt, recrystallized from absolute methanol melted at 236.8° C. (corr.) with decomposition.

*Example 4B.—3-(4-dimethylaminobenzyl)8-methyl-3,8-diazabicyclo[3.2.1]octane*

Following the procedure given in Example 1B, 3-(4-dimethylaminobenzyl)-8-methyl - 3,8-diazabicyclo[3.2.1] octane can be prepared by reducing 3-(4-dimethylaminobenzyl)-2,4-dioxo - 8-methyl-3,8 - diazabicyclo[3.2.1]octane with lithium aluminum hydride.

*Example 5A.—3-(4-chlorobenzyl)2,4-dioxo-8-methyl-3,8-diazabicyclo[3.2.1]octane*

Following the procedure given in Example 1A, 3-(4-chlorobenzyl)-2,4-dioxo-8-methyl-3,8-diazabicyclo[3.2.1] octane was prepared from diethyl 1-methyl-2,5-pyrrolidinedicarboxylate and 4-chlorobenzylamine. In the form of its free base, recrystallized from absolute ethanol, it melted at 103.0–110.4° C. (corr.).

*Example 5B.—3-(4-chlorobenzyl)-8-methyl-3,8-diazabicyclo[3.2.1]octane dihydrochloride*

Following the procedure given in Example 1B, 3-(4-chlorobenzyl) - 2,4-dioxo - 8-methyl - 3,8-diazabicyclo-[3.2.1]octane was reduced with lithium aluminum hydride. The resulting 3-(4-chlorobenzyl)-8-methyl-3,8-diazabicyclo[3.2.1]octane, in the form of its dihydrochloride salt, melted at 234.0–237.2° C. (corr.).

*Example 5C.—3-(4-chlorobenzyl)-8-methyl-3,8-diazabicyclo[3.2.1]octane benzochloride*

Following the procedure given in Example 1C, 3-(4-chlorobenzyl)-8-methyl-3,8-diazabicyclo[3.2.1]octane can be reacted with benzyl chloride to give 3-(4-chlorobenzyl)-8-methyl-3,8 - diazabicyclo[3.2.1]octane benzochloride.

*Example 6A.—2,4-dioxo-8-methyl-3-phenethyl-3,8-diazabicyclo[3.2.1]octane hydrochloride*

Following the procedure given in Example 1A, diethyl 1-methyl-2,5-pyrrolidinedicarboxylate was reacted with phenethylamine. In the form of its hydrochloride salt, the resulting 2,4-dioxo-8-methyl-3-phenethyl-3,8-diazabicyclo[3.2.1]octane melted at 205.6–210.8° C. (corr.).

*Example 6B.—8-methyl-3-phenethyl-3,8-diazabicyclo[3.2.1]octane dihydrochloride*

Following the procedure given in Example 1B, 2,4-dioxo-8-methyl-3-phenethyl-3,8 - diazabicyclo[3.2.1]octane was reduced with lithium aluminum hydride to give 8-methyl-3-phenethyl-3,8-diazabicyclo[3.2.1]octane which, in the form of its dihydrochloride salt, melted at 245° C. (corr.) with decomposition.

*Example 6C.—8-methyl-3-phenethyl-3,8-diazabicyclo[3.2.1]octane methosulfate*

Following the procedure given in Example 1C, 8-methyl-3-phenethyl-3,8-diazabicyclo[3.2.1]octane can be reacted with dimethyl sulfate to give 8-methyl-3-phenethyl-3,8-diazabicyclo[3.2.1]octane methosulfate.

*Example 7A.—3-(3,4-dimethoxybenzyl)-2,4-dioxo-8-methyl-3,8-diazabicyclo[3.2.1]octane hydrochloride*

Following the procedure given in Example 1A, diethyl 1-methyl-2,5-pyrrolidinedicarboxylate was reacted with 3,4-dimethoxybenzylamine. The resulting 3-(3,4-dimethoxy)-2,4-dioxo-8-methyl-3,8-diazabicyclo[3.2.1]octane, in the form of its hydrochloride salt, melted at 228° C. (corr.) with decomposition.

*Example 7B.—3-(3,4-dimethoxybenzyl)-8-methyl-3,8-diazabicyclo[3.2.1]octane dihydrochloride*

Following the procedure given in Example 1B, 3-(3,4-dimethoxybenzyl) - 2,4-dioxo-8-methyl-3,8-diazabicyclo[3.2.1]octane was reduced with lithium aluminum hydride to give 3-(3,4-dimethoxybenzyl)-8-methyl-3,8-diazabicyclo[3.2.1]octane dihydrochloride, which after recrystallization from absolute ethanol melted at 194.4° C. (corr.) with decomposition.

*Example 7C.—3-(3,4-dimethoxybenzyl)-8-methyl-3,8-diazabicyclo[3.2.1]octane allylbromide*

Following the procedure given in Example 1C, 3-(3,4-dimethoxybenzyl) - 8-methyl-3,8 - diazabicyclo[3.2.1]octane can be reacted with allyl bromide to give 3-(3,4-dimethoxybenzyl)-8-methyl-3,8 - diazabicyclo[3.2.1]octane allylbromide.

*Example 8.—1-benzyl-2,5-dicarbethoxypyrrolidine*

To 86 g. (0.80 m.) of benzylamine was added 96 g. (0.267 m.) of diethyl α,α'-dibromoadipate with ice cooling. When the reaction mixture was allowed to warm to room temperature a vigorous reaction started. The reaction was kept under control with ice cooling and then was completed by heating on a steam bath. The crystalline product was taken up in 200 mm. of 5 N sulfuric acid, extracted with ether, made basic with solid sodium bicarbonate, and extracted four times with ether. The solvent was removed under reduced pressure, and the residual oil was vacuum distilled to give 1-benzyl-2,5-dicarbethoxypyrrolidine as a colorless oil boiling at 210–216° C. at 14 mm.

*Example 9A.—3,8-dibenzyl-2,4-dioxo-3,8-diazabicyclo[3.2.1]octane hydrochloride*

Following the procedure given in Example 1A, 1-benzyl-2,5-dicarbethoxypyrrolidine (15.3 g., 0.05 m.) was reacted with 6 g. (0.056 m.) of benzylamine. The pure 3,8 - dibenzyl - 2,4 - dioxo - 3,8 - diazabicyclo[3.2.1]octane in the form of its hydrochloride salt melted at 192.4° C. (corr.).

*Example 9B.—3,8-dibenzyl-3,8-diazabicyclo[3.2.1]octane*

Following the procedure given in Example 1B, 3,8-dibenzyl - 2,4 - dioxo - 3,8 - diazabicyclo[3.2.1]octane was reduced with lithium aluminum hydride to give 3,8-bibenzyl - 3,8 - diazabicyclo[3.2.1]octane which after recrystallization from ethanol-water melted at 58.6–60.4° C. (corr.).

*Example 9C.—3,8-dibenzyl-2,4-dioxo-3,8-diazabicyclo[3.2.1]octane methiodide*

Following the procedure given in Example 1C, 3,8-dibenzyl - 2,4 - dioxo - 3,8 - diazabicyclo[3.2.1]octane can be reacted with methyl iodide to give 3,8 - dibenzyl-2,4 - dioxo - 3,8 - diazabicyclo[3.2.1]octane methiodide.

*Example 9D.—3,8-dibenzyl-3,8-diazabicyclo[3.2.1]octane bismethiodide*

Following the procedure given in Example 1C, 3,8-dibenzyl - 3,8 - diazabicyclo[3.2.1]octane can be reacted with an excess of methyl iodide to give 3,8 - dibenzyl-3,8-diazabicyclo[3.2.1]octane bismethiodide.

*Example 10.—3,8-diazabicyclo[3.2.1]octane dihydrochloride*

Following the procedure given in Example 2, 3,8 - dibenzyl - 3,8 - diazabicyclo[3.2.1]octane was hydrogenated over palladium charcoal to give 3,8 - diazabicyclo[3.2.1]octane in the form of its dihydrochloride salt which after recrystallization from absolute methanol melted above 300°.

*Example 11A.—3-(3-acetoxy-2-phenylpropanol)-8-methyl-3,8-diazabicyclo[3.2.1]octane hydrochloride*

To a solution containing 3.22 g. (0.08 m.) of sodium hydroxide in 50 ml. of water was added 5.3 g. (0.027 m.) of 8 - methyl - 3,8 - diazabicyclo[3.2.1]octane dihydrochloride. α-Acetoxymethylphenylacetyl chloride (6.10 g., 0.027 m.) was added and the reaction mixture was kept cold overnight. The solution was saturated with sodium chloride and extracted several times with chloroform. After drying over magnesium sulfate, ethereal hydrogen chloride was added and the white 3 - (3 - acetoxy - 2-phenylpropanoyl) - 8 - methyl - 3,8 - diazabicyclo[3.2.1]octane hydrochloride was collected.

*Example 11B.—3-(3-hydroxy-2-phenylpropanoyl)-8-methyl-3,8-diazabicyclo[3.2.1]octane hydrochloride*

To a solution containing 5 g. (0.014 m.) of 3-(3-acetoxy-2 - phenylpropanoyl) - 8 - methyl - 3,8 - diazabicyclo[3.2.1]octane hydrochloride in 50 ml. of absolute methanol was added 4 ml. of 4 N hydrochloric acid and the solution was allowed to stand at room temperature for several days. Addition of a large quantity of absolute ether caused the precipitation of a white gum which solidified in absolute ethanol. 3 - (3 - hydroxy - 2 - phenylpropanoyl) - 8 - methyl - 3.8 - diazabicyclo [3.2.1]octane hydrochloride thus prepared and recrystallized from absolute ethanol-absolute ether melted at 195.3–203.0° C. (corr.).

3 - (3 - hydroxy - 2 - phenylpropanoyl) - 8 - methyl-3,8 - diazabicyclo[3.2.1]octane hydrochloride was tested for antispasmodic activity by a modification of the method reported by H. R. Ing [Brit. Med. Bull., 4, 91 (1946)] and was found to have 15.5 percent the activity of atropine sulfate in the mouse after subcutaneous injection.

The i.v. toxicity in the mouse was $LD_{50}=160\pm12$ mg./kg.

*Example 12.—3-ethanesulfonyl-8-methyl-3,8-diazabicyclo[3.2.1]octane hydrochloride*

A solution containing 5.2 g. (0.04 m.) of 8 - methyl-3,8-diazabicyclo[3.2.1]octane in 100 ml. of dry ether was added dropwise during two hours to a well-stirred solution containing 5.3 g. (0.04 m.) of ethanesulfonyl chloride in 100 ml. of dry ether. The white granular solid consisting of 3 - ethanesulfonyl - 8 - methyl - 3,8 - diazabicyclo[3.2.1]octane hydrochloride was recrystallized from methanol-ether and then methanol to give white crystals melting at 261.2–264.6° C. (corr.) with decomposition.

*Example 13.—3,8-dimethyl-3,8-diazabicyclo[3.2.1]octane dihydrochloride*

8-methyl-3,8-diazabicyclo[3.2.1]octane was methylated according to the Eschweiler-Clarke procedure. 8-methyl-3,8-diazabicyclo[3.2.1]octane (4.8 g., 0.039 m.) was added cautiously and with cooling to 15 ml. of 100 percent formic acid, and 3.4 g. (0.04 m.) of 37 percent formalin was added. The reaction mixture was heated overnight on a steam bath and then 9 ml. of concentrated hydrochloric acid was added. After being heated on the steam bath for three more hours the solution was made strongly basic with 35 percent sodium hydroxide solution and was extracted several times with ether. The ether solution was dried over anhydrous calcium sulfate, and ethereal hydrogen chloride was added. The 3,8-dimethyl-3,8-diazabicyclo[3.2.1]octane dihydrochloride thus produced after recrystallization from ethanol melted at 273.2–277.4° C. (corr.) with decomposition.

*Example 14.—3-(α-hydroxyphenylacetyl)8-methyl-3,8-diazabicyclo[3.2.1]octane hydrochloride*

Following the procedure given in Example 11A, 8 - methyl - 3 - diazabicyclo[3.2.1]octane dihydrochloride (7.96 g., 0.04 m.) was reacted with 8.4 g. (0.04 m.) of α-acetoxyphenylacetyl chloride. The acetoxy group was hydrolyzed with dilute sodium hydroxide solution. The 3 - (α - hydroxyphenylacetyl) - 8 - methyl - 3,8 - diazabicyclo[3.2.1]octane in the form of its hydrochloride salt thus produced, melted at 226.4–227.8° C. (corr.).

*Example 15A.—3-benzoyl-8-methyl-3,8-diazabicyclo-[3.2.1]octane hydrochloride*

Following the procedure given in Example 11A, 8-methyl - 3,8 - diazabicyclo[3.2.1]octane dihydrochloride (5.97 g., 0.03 m.) was acylated with 4.23 g. (0.03 m.) of benzoyl chloride. The 3-benzoyl-8-methyl-3,8-diazabicyclo[3.2.1]octane in the form of its hydrochloride salt, after recrystallization from absolute methanol-ether, melted at 264.4–267.6° C. (corr.).

*Example 15B.—3-benzoyl-8-methyl-3,8-diazabicyclo-[3.2.1]octane methochloride*

To a solution containing 3.2 g. (0.012 m.) of 3-benzoyl-8 - methyl - 3,8 - diazabicyclo[3.2.1]octane hydrochloride (Example 15A) in 100 ml. of absolute methanol was added 1.7 g. of anhydrous potassium carbonate and 5 ml. of methyl iodide and the mixture was refluxed overnight. The reaction mixture was then concentrated to 30 ml. and filtered. The white crystals which separated, consisting of 3-benzoyl-8-methyl-3.8-diazabicyclo[3.2.1]octane methiodide, melted at 235–238° C. The methiodide was dissolved in about 100 ml. of deionized water and poured through a column of chloride ion exchange resin. After the solvent was evaporated the remaining gum was crystallized from absolute ethanol-absolute ether. 3-benzyl-8-methyl-3,8-diazabicyclo[3.2.1]octane methochloride thus prepared melted at 239.0–240.6° C. (corr.) with decomposition.

*Example 16.—3-(3-indolylmethyl)-8-methyl-3,8-diazabicyclo[3.2.1]octane*

3 - (3 - indolylmethyl) - 8 - methyl - 3,8 - diazabicyclo-[3.2.1]octane was prepared by the Mannich procedure from 3.78 g. (0.03 m.) of 8-methyl-3,8-diazabicyclo-[3.2.1]octane, 2.44 g. of 37 percent formalin, 3.51 g. (0.03 m.) of indole and 6 ml. of glacial acetic acid. The reaction was run for two hours at room temperature, and then the solution was diluted with 100 ml. of water and made basic with ammonium hydroxide. Solid 3-(3-indolylmethyl) - 8 - methyl - 3,8 - diazabicyclo[3.2.1]octane precipitated and was recrystallized from ethanol-water. The pure 3-(3-indolylmethyl)-8-methyl-3,8-diazabicyclo-[3.2.1]octane melted at 153.8–157.6° C. (corr.).

*Example 17.—3-(4-chlorobenzhydrylthiocarbamyl)-8-methyl-3,8-diazabicyclo[3.2.1]octane*

To a solution containing 6 g. (0.03 m.) of 8-methyl-3,8-diazabicyclo[3.2.1]octane dihydrochloride in 5 ml. of water was added excess sodium hydroxide and the free base was extracted into about 200 ml. of benzene. 4-chlorobenzhydrylisothiocyanate (5.2 g., 0.02 ml.) in 50 ml. of benzene was added, and the solution was refluxed for 1.5 hours. The gum which resulted from removal of the solvent was crystallized from benzene-hexane. The 3-(4-chlorobenzhydrylthiocarbamyl) - 8 - methyl - 3,8 - diazabicyclo[3.2.1]octane thus prepared melted at 123.6–127.2° C. (corr.).

*Example 18A.—3-diphenylchloroacetyl-8-methyl-3,8-diazabicyclo[3.2.1]octane hydrochloride*

To a suspension containing 4 g. (0.02 m.) of 8-methyl-3,8-diazabicyclo[3.2.1]octane dihydrochloride in 60 ml. of benzene was added 10 ml. of 35 percent aqueous sodium hydroxide. After the mixture had been well stirred, the organic layer was separated and the aqueous layer was extracted three times with benzene. The combined benzene layers were dried over anhydrous calcium sulfate, and to that solution was added 5.3 g. (0.02 m.) of diphenylchloroacetyl chloride dropwise and with stirring. The white crystals that separated, consisting of 3-diphenylchloroacetyl - 8 - methyl - 3,8 - diazabicyclo[3.2.1]octane hydrochloride melted at 248–250° C. with decomposition.

*Example 18B.—3-(α-hydroxydiphenylacetyl)-8-methyl-3,8-diazabicyclo[3.2.1]octane*

3 - diphenylchloroacetyl - 8 - methyl-3,8-diazabicyclo [3,2,1]octane hydrochloride prepared as in Example 18A (5 g.) dissolved in water was basified with 10 percent sodium carbonate solution. The gum which resulted, consisting of 3-(α-hydroxydiphenylacetyl)- 8-methyl-3,8-diazabicyclo[3.2.1]octane was crystallized and recrystallized from ethanol-water. The pure 3-(α-hydroxydiphenylacetyl) - 8 - methyl-3,8-diazabicyclo[3.2.1]octane melted at 193.6–200.6° C. (corr.).

*Example 19.—3-diphenylacetyl-8-methyl-3,8-diazabicyclo[3.2.1]octane hydrochloride*

The free base was recrystallized from 10 g. (0.05 m.) of 8 - methyl-3,8-diazabicyclo[3.2.1]octane dihydrochloride and was dissolved in about 300 ml. of benzene. The solution was heated to boiling and 11.5 g. (0.05 m.) of diphenylacetyl chloride dissolved in 50 ml. of benzene was added dropwise over one half hour. The reaction mixture was refluxed for two hours following the addition. The addition of an equal volume of ether caused the precipitation of crude 3-diphenylacetyl-8-methyl-3,8-diazabicyclo[3,2,1]octane hydrochloride which was recrystallized from absolute methanol. The pure 3-diphenylacetyl-8-methyl-3,8-diazabicyclo[3.2.1]octane hydrochloride melted at 278.2–281.75° C. (corr.) and started decomposing at 268° C. (corr.).

*Example 20.—3-(2-hydroxyethyl)-8-methyl-3,8-diazabicyclo[3.2.1]octane dihydrochloride*

To a suspension containing 60 g. (0.3 m.) of 8-methyl-3,8-diazabicyclo[3.2.1]octane dihydrochloride in 300 ml. of benzene was added 28 g. (0.7 m.) of sodium hydroxide and 30 ml. of water. After the mixture had been well stirred, the benzene layer was dried over anhydrous calcium sulfate and the solvent was removed at atmospheric pressure. The resulting free base was dissolved in 50 ml. of absolute ethanol, cooled in ice and to it was added a solution containing 15.4 g. (0.35 m.) of ethylene oxide dissolved in 50 ml. of absolute ethanol. The solution was allowed to warm to room temperature and to stand overnight. After the solvent had been removed, the residual oil was distilled under nitrogen. The 3-(2-hydroxyethyl)-8-methyl-3,8-diazabicyclo[3.2.1]octane thus prepared boiled at 89–90° C. at 0.4 mm.

3-(2-hydroxyethyl)-8-methyl - 3,8 - diazabicyclo[3.2.1]octane in the form of its dihydrochloride salt melted at 329.4–240.8° C. (corr.) with decomposition.

*Example 21A.—3-(2-chlorobenzyl)-8-methyl-2,4-dioxo-3,8-diazabicyclo[3.2.1]octane hydrochloride*

Following the procedure given in Example 1A, 15 g. of o-chlorobenzylamine was reacted with 22.8 g. (0.1 m.) of diethyl 1-methyl-2,5-pyrrolidinedicarboxylate. The resulting 3-(2-chlorobenzyl)-8-methyl-2,4-dioxo - 3,8 - diazabicyclo[3.2.1]octane hydrochloride, recrystallized from absolute methanol melted at 250.0–251.6° C. (corr.) with decomposition.

*Example 21B.—3-(2-chlorobenzyl)-8-methyl-3,8-diazabicyclo[3.2.1]octane*

Following the procedure given in Example 1B, 3-(2-chlorobenzyl)-8-methyl - 2,4 - dioxo - 3,8 - diazabicyclo[3.2.1]octane can be reduced with lithium aluminum hydride to give 3-(2-chlorobenzyl)-8-methyl-3,8-diazabicyclo[3.2.1]octane.

*Example 22.—3-(2-carbanilinoxyethyl)-8-methyl-3,8-diazabicyclo[3.2.1]octane dihydrochloride*

To a solution containing 3.4 g. (0.02 m.) of 3-(2-hydroxyethyl)-8-methyl-3,8-diazabicyclo[3.2.1]octane in 20 ml. of dry benzene was added 2.4 g. (0.02 m.) of phenylisocyanate. The solution was brought to reflux and allowed to cool. Excess ethereal hydrogen chloride was added, and the resulting gum was crystallized from absolute ethanol-absolute ether. The pure 3-(2-carbanilinoxyethyl)-8-methyl-3,8-diazabicyclo[3.2.1]octane in the form of its dihydrochloride salt had an indefinite melting point, softening at 176.8° C. (corr.).

*Example 23.—3-(2-benzoyloxyethyl)-8-methyl-3,8-diazabicyclo[3.2.1]octane dihydrochloride*

To a solution containing 3.4 g. (0.02 m.) of 3-(2-hydroxyethyl)-8-methyl - 3,8 - diazabicyclo[3.2.1]octane, 0.8 g. (0.02 m.) of sodium hydroxide and 20 ml. of water was added dropwise 2.3 ml. (0.02 m.) of benzoylchloride. The mixture was shaken thoroughly while cooled in ice and was extracted three times with ether. To the dried ether extracts was added ethereal hydrogen chloride, and the resulting gum was crystallized from absolute ethanol-absolute ether. Recrystallization of the 3-(2-benzoyloxyethyl) - 8 - methyl - 3,8 - diazabicyclo[3.2.1] octane dihydrochloride thus prepared gave white crystals which melted at 197.2–209.6° C. (corr.) with decomposition.

3-(2-benzoyloxyethyl) - 8 - methyl - 3,8 - diazabicyclo[3.2.1]octane dihydrochloride was tested for local anesthetic activity according to the method reported by Luduena and Hoppe [J. Pharmacol. Exptl. Therap. 117, 89 (1956)] and was found to have 1.1 times the activity of procaine in guinea pigs.

The i.v. toxicity in the mouse was $LD_{50} = 28 \pm 1.0$ mg./kg.

*Example 24A.—1-(3-diethylaminopropyl)-2,5-dicarbethoxypyrrolidine*

Following the procedure given in Example 8, 1-(3-diethylaminopropyl)-2,5 - dicrabethoxypyrrolidine was prepared from 130.2 g. (1.0 m.) of 3-diethylaminopropylamine and 180 g. (0.5 m.) of diethyl-α,α′dibromoadipate in 700 ml. of benzene. The 1-(3-diethylaminopropyl)-2,5-dicarbethoxypyrrolidine boiled at 135–140° C. at 0.5 mm.; $n_D^{25} = 1.4588$.

*Example 24B.—3-benzyl - 8 - (3-diethylaminopropyl)-2,4-dioxo - 3,8 - diazabicyclo[3.2.1] octane dihydrochloride*

Following the procedure given in Example 1A, 32.8 g. (0.1 m.) of 1-(3-diethylaminopropyl)-2,5-dicarbethoxypyrrolidine was reacted with 10.7 g. (0.1 m.) of benzylamine. 3-benzyl-8-(3 - diethylaminopropyl)-2,4 - dioxo-3,8-diazabicyclo[3.2.1]octane in the form of its hydrochloride salt, recrystallized from absolute ethanol, melted at 183.0–194.8° C. (corr.).

Following the testing procedure reported by Luduena and Hoppe [J. Pharmacol. Exptl. Therap., 117, 89 (1956)] 3-benzyl-8-(3-diethylaminopropyl) - 2,4 - dioxo-3,8 - diazabicyclo[3.2.1]octane dihydrochloride was found to have 2.0 times the local anesthetic activity of procaine in guinea pigs.

The i.v. toxicity in the mouse was $ALD_{50} = 31$ mg./kg.

*Example 24C.—3-benzyl-8-(3-diethylaminopropyl)-3,8-diazabicyclo[3.2.1]octane*

Following the procedure given in Example 1B, 3-benzyl-8-(3-diethylaminopropyl)-2,4-dioxo - 3,8 - diazabicyclo[3.2.1]octane can be reduced with lithium aluminum hydride to give 3-benzyl-8-(3-diethylaminopropyl)-3,8-diazabicyclo[3.2.1]octane.

*Example 25A.—3-(3-diethylaminopropyl) - 8 - methyl-2,4 - dioxo - 3,8 - diazabicyclo[3.2.1]octane dihydrochloride.*

Following the procedure given in Example 1A, 6.5 g. of diethylaminopropylamine was reacted with 11.4 g. (0.05 m.) of diethyl 1-methyl-2,5-pyrrolidine dicarboxylate. 3-(3-diethylaminopropyl)-8 - methyl-2,4-dioxo - 3,8-diazabicyclo[3.2.1]octane in the form of its hydrochloride salt, recrystallized from absolute ethanol, melted at 209.2–212.2° C. (corr.).

*Example 25B.—3-(3-diethylaminopropyl)-8-methyl-3,8-diazabicyclo[3.2.1]octane trihydrochloride*

Following the procedure given in Example 1B, 11 g. of 3-(3-diethylaminopropyl)-8-methyl - 2,4 - dioxo-3,8-diazabicyclo[3.2.1]octane dihydrochloride was reduced with 5 g. of lithium aluminum hydride in 750 ml. of absolute ether. 3-(3-diethylaminopropyl) - 8 - methyl - 3,8-diazabicyclo[3.2.1]octane thus prepared, boiled at 126–130° C. at 3.5 mm.; $n_D^{25} = 1.4782$. 3-(3-diethylaminopropyl)-8-methyl - 3,8 - diazabicyclo[3.2.1]octane in the form of its trihydrochloride, recrystallized from absolute ethanol-ether, melted at 169–171° C.

*Example 25C.—3-(3-diethylaminopropyl)-8-methyl-3,8-diazabicyclo[3.2.1]octane bismethochloride*

Following the procedure given in Example 15B, 3.5 g. (0.01 m.) of 3-(3 - diethylaminopropyl) - 8 - methyl-3,8-diazabicyclo[3.2.1]octane was reacted with 15 ml. of methyl iodide and 2.34 g. (0.017 m.) of potassium carbonate in 100 ml. of absolute methanol. Following ion exchange with the formation of the methochloride, the product, 3-(3-diethylaminopropyl) - 8 - methyl - 3,8-diazabicyclo[3.2.1]octane bismethochloride melted at 263.4–266.4° C. (corr.) with decomposition.

*Example 26A.—3 - (2-diethylaminoethyl) - 8 - methyl-2,4 - dioxo - 3,8 - diazabicyclo[3.2.1]octane dihydrochloride.*

Following the procedure given in Example 1A, 22.8 g. (0.1 m.) of diethyl 1-methyl - 2,5 - pyrrolidine dicarboxylate was reacted with 117 g. (0.1 m.) of diethylaminoethylamine. Following recrystallization from absolute ethanol, the pure 3-(2 - diethylaminoethyl) - 8-methyl - 2,4-dioxo-3,8-diazabicyclo[3.2.1]octane dihydrochloride thus prepared melted at 221.0–222.8° C. (corr.) with decomposition.

*Example 26B.—3-(2-diethylaminoethyl)-8-methyl-3,8-diazabicyclo[3.2.1]octane trihydrochloride*

Following the procedure given in Example 1B, 5 g. of 3-(2-diethylaminoethyl) - 8 - methyl - 2,4-dioxo-3,8-diazabicyclo[3.2.1]octane free base was reduced with 4.5 g. of lithium aluminum hydride in 600 ml. of absolute ether. 3-(2-diethylaminoethyl)-8-methyl-3,8 - diazabicyclo[3,2,1]octane in the form of its trihydrochloride salt thus produced melted at 225.6–233.2° C. (corr.) with decomposition.

*Example 27A.—3 - (4 - diethylaminobutyl)-8 - methyl-2,4 - dioxo - 3,8 - diazabicyclo[3.2.1]octane dihydrochloride.*

Following the procedure given in Example 1A, 22.9 g. (0.1 m.) of diethyl 1-methyl-2,5-pyrrolidine dicarboxylate was reacted with 14.4 g. (0.1 m.) of 4-diethylaminobutylamine. The hydrochloride was prepared in ethanol-ether and recrystallized from the same solvents. Pure 3-(4 - diethylaminobutyl) - 8 - methyl - 2,4 - dioxo-3,8-diazabicyclo[3.2.1]octane dihydrochloride melted at 194.6–196.2° C. (corr.) with decomposition.

*Example 27B.—3-(4-diethylaminobutyl)-8-methyl-3,8-diazabicyclo[3.2.1]octane*

Following the procedure given in Example 1B, 3-(4-diethylaminobutyl) - 8 - methyl - 3,8 - diazabicyclo[3.2.1]octane can be prepared by reducing 3-(4-diethylaminobutyl) - 8-methyl-2,4-dioxo-3,8-diazabicyclo[3.2.1]octane with lithium aluminum hydride.

*Example 28A.—8-methyl-3-[3-(10-phenothiazinyl)propyl]-3,8-diazabicyclo[3.2.1]octane dihydrochloride*

Following the procedure given in Example 1A, diethyl 1-methyl-2,5-pyrrolidine dicarboxylate (11.5 g.) was reacted with 12.8 g. (0.05 m.) of 10-(3-aminopropyl) phenothiazine. The pure 8-methyl-2,4-dioxo-3-[3-(10-phenothiazinyl)propyl]-3,8-diazabicyclo[3.2.1]octane recrystallized from 95 percent ethanol melted at 133.4–137.2° C. (corr.).

*Example 28B.—8-methyl-3-[3-(10phenothiazinyl)propyl] 3,8-diazabicyclo[3.2.1]-octane dihydrochloride*

Following the procedure given in Example 1B, 8-methyl - 2,4-dioxo-3-[3-(10-phenothiazinyl)propyl]-3,8-diazabicyclo[3.2.1]octane (13 g.) was reduced with 8 g. of lithium aluminum hydride in 1500 ml. of dry ether. 8-methyl - 3 - [3 - (10-phenothiazinyl)propyl]-3,8-diazabicyclo[3.2.1]octane in the form of its dihydrochloride, recrystallized from absolute ethanol, melted at 136.2° C. but softened at 118.0° C. (corr.).

Following the procedure given in Example 1A, there can also be prepared for example:

3 - (6-aminohexyl)-8-propyl-2,4-dioxo-3,8-diazabicyclo[3.2.1]octane from 1,6-hexanediamine and diethyl 1-propyl-2,5-pyrrolidinedicarboxylate, which in turn can be prepared from propylamine and diethyl α,α′-dibromoadipate according to the method of Example 8;

3 - cyclohexyl - 8 - isobutyl-2,4-dioxo-3,8-diazabicyclo[3.2.1]octane from cyclohexylamine and diethyl 1-isobutyl-2,5-pyrrolidine dicarboxylate, which in turn can be prepared from isobutylamine and diethyl α,α′-dibromoadipate according to the method of Example 8;

3,8-diallyl-2,4-dioxo-3,8-diazabicyclo[3.2.1]octane from allylamine and diethyl 1-allyl-2,5-pyrrolidinedicarboxylate, which in turn can be prepared from allylamine and diethyl α,α′-dibromoadipate according to the method of Example 8;

3 - methallyl - 8-cyclopentyl-2,4-dioxo-3,8-diazabicyclo-[3.2.1]octane from methallylamine and diethyl 1-cyclopentyl-2,5-pyrrolidinedicarboxylate, which in turn can be prepared from cyclopentylamine and diethyl α,α′-dibromoadipate according to the method of Example 8;

3,8-diisopropyl-2,4-dioxo-3,8-diazabicyclo[3.2.1]octane from isopropylamine and diethyl 1-isopropyl-2,5-pyrrolidinedicarboxylate, which in turn can be prepared from isopropylamine and diethyl α,α′-dibromoadipate according to the method of Example 8;

3 - (4 - nitrobenzyl)-8-cyclopropyl-2,4-dioxo-3,8-diazabicyclo[3.2.1]octane from p-nitrobenzylamine and diethyl 1-cyclopropyl-2,5-pyrrolidinedicarboxylate, which in turn can be prepared from cyclopropylamine and diethyl α,α′-dibromoadipate according to the method of Example 8;

3 - cyclooctyl - 8 - (2-ethylbutyl)-2,4-dioxo-3,8-diazabicyclo[3.2.1]octane from cyclooctylamine and diethyl 1-(2-ethylbutyl)-2,5-pyrrolidinedicarboxylate, which in turn can be prepared from 2-ethylbutylamine and diethyl α,α′-dibromoadipate according to the method of Example 8;

3 - [3 - (4 - chlorophenyl)propyl]-8-phenyl-2,4-dioxo-3,8 - diazabicyclo[3.2.1]octane from 3 - (4-chlorophenyl)propylamine and diethyl 1-phenyl-2,5-pyrrolidinedicarboxylate, which in turn can be prepared from aniline and diethyl α,α′-dibromoadipate according to the method of Example 8;

3,8 - diphenyl - 2,4-dioxo-3,8-diazabicyclo[3.2.1]octane from aniline and diethyl 1-phenyl-2,5-pyrrolidinedicarboxylate, which in turn can be prepared from aniline and diethyl α,α′-dibromoadipate according to the method of Example 8;

3 - (2 - methoxyethyl) - 8 - (4-methoxyphenyl)-2,4-dioxo-3,8-diazabicyclo[3.2.1]octane from 2-methoxyethylamine and diethyl 1-(4-methoxyphenyl)-2,5-pyrrolidinedicarboxylate, which in turn can be prepared from p-anisidine and diethyl α,α′-dibromoadipate according to the method of Example 8;

3 - (3 - hydroxypropyl)-8-methyl-2,4-dioxo-3,8-diazabicyclo[3.2.1]octane from 3-hydroxypropylamine and diethyl 1-methyl-2,5-pyrrolidinedicarboxylate.

Following the procedure given in Example 1B, the following examples can also be prepared from the corresponding dioxo compounds shown above.

3 - (6-aminohexyl)-8-propyl-3,8-diazabicyclo[3.2.1] octane.

3-cyclohexyl-8-isobutyl-3,8-diazabicyclo[3.2.1]octane.

3,8-diallyl-3,8-diazabicyclo[3.2.1]octane.

3 - methallyl - 8 - cyclopentyl-3,8-diazabicyclo[3.2.1]octane.

3,8-diisopropyl-3,8-diazabicyclo[3.2.1]octane.

3 - cyclooctyl-8-(2-ethylbutyl)-3,8-diazabicyclo[3.2.1]-octane.

3 - [3 - (4 - chlorophenyl)propyl]-8-phenyl-3,8-diazabicyclo[3.2.1]octane.

3,8-diphenyl-3,8-diazabicyclo[3.2.1]octane.

3 - (2 - methoxyethyl)-8-(4-methoxyphenyl)-3,8-diazabicyclo[3.2.1]octane.

Following the procedure given in Example 2, there can also be prepared:

8-phenyl-3,8-diazabicyclo[3.2.1]octane.

8-n-hexyl-3,8-diazabicyclo[3.2.1]octane.

8-(4-methylcyclohexyl)-3,8-diazabicyclo[3.2.1]octane.

8-cyclobutyl-3,8-diazabicyclo[3.2.1]octane.

8-(3-methylbutyl)-3,8-diazabicyclo[3.2.1]octane.

8-propyl-3,8-diazabicyclo[3.2.1]octane.

8-ethyl-3,8-diazabicyclo[3.2.1]octane.

8-butyl-3,8-diazabicyclo[3.2.1]octane.

8-cyclopropyl-3,8-diazabicyclo[3.2.1]octane.

3-(4-tolyl)-3,8-diazabicyclo[3.2.1]octane.

Following the procedure given in Example 11A, there can be prepared:

3,8-diacetyl - 3,8 - diazabicyclo[3.2.1]octane from 3,8-diazabicyclo[3.2.1]octane and excess acetic anhydride.

3-(4-chlorobenzenesulfonyl)-8 - n - propyl - 3,8 - diazabicyclo[3.2.1]octane from 8-n-propyl - 3,8 - diazabicyclo[3.2.1]octane and 4-chlorobenzenesulfonyl chloride.

3-butyryl-8-ethyl - 3,8-diazabicyclo[3.2.1]octane from 8-ethyl-3,8-diazabicyclo[3.2.1]octane and butyric anhydride.

3 - (1 - naphthoyl) - 8 - phenyl-3,8-diazabicyclo[3.2.1]octane from 8-phenyl-3,8-diazabicyclo[3.2.1]octane and 1-naphthoyl chloride.

3-dichloroacetyl - 8 - butyl - 3,8 - diazabicyclo[3.2.1]octane from 8-butyl-3,8-diazabicyclo[3.2.1]octane and dichloroacetyl chloride.

3-(2-nitrobenzoyl) - 8 - cyclopropyl - 3,8 - diazabicyclo[3.2.1]octane from 8-cyclopropyl - 3,8 - diazabicyclo[3.2.1]octane and 2-nitrobenzoyl chloride.

3-nicotinoyl-8-ethyl-3,8-diazabicyclo[3.2.1]octane from 8-ethyl-3,8-diazabicyclo[3.2.1]octane and nicotinoyl chloride.

3-stearoyl-8-methyl-3,8-diazabicyclo[3.2.1]octane from 8 - methyl - 3,8 - diazabicyclo[3.2.1]octane and stearoyl chloride.

3-(4-tolyl) - 8 - phthaloyl - 3,8-diazabicyclo[3.2.1]octane from 3-(4-tolyl)-3,8-diazabicyclo[3.2.1]octane and phthalic anhydride.

3,8 - bis(p-toluenesulfonyl) - 3,8 - diazabicyclo[3.2.1]octane from 3,8-diazabicyclo[3.2.1]octane and an excess of p-toluenesulfonyl chloride.

I claim:
1. A compound of the formula

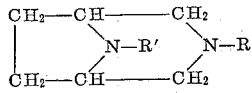

wherein R' is lower-alkyl and R is hydroxy-lower-alkyl.

2. A compound of the formula

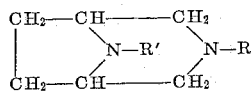

wherein R' is lower-alkyl and R is di-(lower-alkyl)amino-lower-alkyl.

3. A compound of the formula

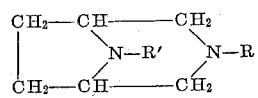

wherein R' is lower-alkyl and R is carboxylic-acyloxy-lower-alkyl.

4. 3-(4-chlorobenzyl)-8-methyl-3,8-diazabicyclo[3.2.1]octane.

5. 3-(3,4-dimethoxybenzyl)-8-methyl-3,8-diazabicyclo[3.2.1]octane.

6. 3-(3,4 - dichlorobenzyl) - 8 - methyl-3,8-diazabicyclo[3.2.1]octane.

7. 3-(3-indolylmethyl) - 8 - methyl - 3,8 - diazabicyclo[3.2.1]octane.

8. 3-(2-hydroxyethyl) - 8 - methyl - 3,8 - diazabicyclo[3.2.1]octane.

9. 3-(2-carbanilinoxyethyl) - 8 - methyl - 3,8 - diazabicyclo[3.2.1]octane.

10. 3-(2-benzoyloxyethyl)-8-methyl-3,8 - diazabicyclo[3.2.1]octane.

11. 3-(2 - diethylaminoethyl) - 8 - methyl-3,8-diazabicyclo[3.2.1]octane.

12. 3-(3-diethylaminopropyl) - 8 - methyl - 3,8 - diazabicyclo[3.2.1]octane.

13. 3-[3-(10-phenothiazinyl)propyl] - 8 - methyl-3,8-diazabicyclo[3.2.1]octane.

14. 3-carboxylic-acyl-8-lower-alkyl - 3,8 - diazabicyclo[3.2.1]octane.

15. 3-(α-hydroxymethylphenylacetyl) - 8 - methyl-3,8-diazabicyclo[3.2.1]octane.

16. 3-(α - hydroxyphenylacetyl) - 8 - methyl-3,8-diazabicyclo[3.2.1]octane.

17. 3-(α-hydroxydiphenylacetyl)-8-methyl - 3,8-diazabicyclo[3.2.1]octane.

18. 3-diphenylacetyl - 8 - methyl - 3,8 - diazabicyclo[3.2.1]octane.

19. 3 - [N - (4 - chlorobenzhydryl)thiocarbamyl]-8-methyl-3,8-diazabicyclo[3.2.1]octane.

20. 3 - ethanesulfonyl - 8 - methyl - 3,8 - diazabicyclo[3.2.1]octane.

21. A compound of the formula

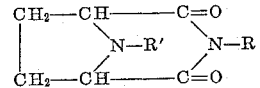

wherein R' is lower-alkyl and R is di-(lower-alkyl)amino-lower-alkyl.

22. A compound of the formula

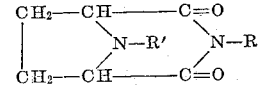

wherein R' is di(lower-alkyl)amino-lower-alkyl and R is phenyl-lower-alkyl.

23. 3 - (3,4 - dichlorobenzyl) - 8 - methyl - 2,4 - dioxo-3,8-diazabicyclo[3.2.1]octane.

24. 3-(4-dimethylaminobenzyl) - 8 - methyl-2,4-dioxo-3,8-diazabicyclo[3.2.1]octane.

25. 3-(3,4 - dimethoxybenzyl) - 8 - methyl-2,4-dioxo-3,8-diazabicyclo[3.2.1]octane.

26. 3-(4-chlorobenzyl) - 8 - methyl - 2,4-dioxo-3,8-diazabicyclo[3.2.1]octane.

27. 3-(2-chlorobenzyl) - 8 - methyl - 3,8 - diazabicyclo[3.2.1]octane.

28. 3-(2-diethylaminoethyl) - 8 - methyl-2,4-dioxo-3,8-diazabicyclo[3.2.1]octane.

29. 3-(3-diethylaminopropyl) - 8 - methyl - 2,4 - dioxo-3,8-diazabicyclo[3.2.1]octane.

30. 3-(4-diethylaminobutyl)-8-methyl - 2,4 - dioxo-3,8-diazabicyclo[3.2.1]octane.

31. 3-benzyl-8-(3 - diethylaminopropyl) - 2,4 - dioxo-3,8-diazabicyclo[3.2.1]octane.

32. 3-[3-(10-phenothiazinyl)propyl] - 8 - methyl-2,4-dioxo-3,8-diazabicyclo[3.2.1]octane.

33. 3-(3 - diethylaminopropyl) - 8-methyl-3,8-diazabicyclo[3.2.1]octane bismethochloride.

References Cited

Barnes et al.: Journal American Chemical Society, vol. 75, pp. 975–977 (1953).

Blackman et al.: Journal Organic Chemistry, vol. 26, pp. 2750–2755 (1961).

Cignarella et al.: Gazzetta Chima Ital., vol. 90, pp. 1495–1504 (1960).

Schipper et al.: Journal Organic Chemistry, vol. 26, pp. 3599–3602 (1961).

HENRY R. JILES, *Primary Examiner.*

NICHOLAS RIZZO, IRVING MARCUS, WALTER A. MODANCE, *Examiners.*

N. H. STEPNO, J. W. ADAMS, *Assistant Examiners.*

UNITED STATES PATENT OFFICE
CERTIFICATE OF CORRECTION

Patent No. 3,328,396                          June 27, 1967

Frederick Karl Kirchner

It is hereby certified that error appears in the above numbered patent requiring correction and that the said Letters Patent should read as corrected below.

Column 5, line 61, for "9.2 mm." read -- 0.2 mm. --; column 10, line 22, for "0.02 ml." read -- 0.02 m. --; column 11, line 20, for "329.4" read -- 239.4 --; column 13, line 6, for "117 g." read -- 11.7 g. --; lines 43 and 44, for "8-methyl-3-[3-(10-phenothiazinyl)propyl]-3,8-diazabicyclo[3.2.1]octane dihydrochloride", in italics, read -- 8-methyl-2,4-dioxo-3-[3-(10-phenothiazinyl)propyl]-3,8-diazabicyclo[3.2.1]octane --, in italics.

Signed and sealed this 5th day of November 1968.

(SEAL)
Attest:

Edward M. Fletcher, Jr.
Attesting Officer

EDWARD J. BRENNER
Commissioner of Patents